Oct. 2, 1951 — L. E. ORR — 2,569,773
ELECTROCONDUCTIVE ARTICLE
Filed Nov. 20, 1948 — 2 Sheets-Sheet 1

Inventor
LEIGHTON E. ORR
By Olen E. Bee
Attorney

Oct. 2, 1951     L. E. ORR     2,569,773
ELECTROCONDUCTIVE ARTICLE
Filed Nov. 20, 1948     2 Sheets-Sheet 2
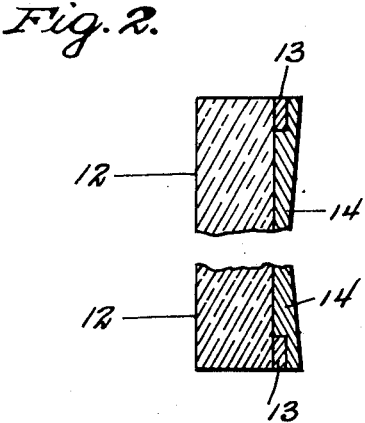
Fig. 2.
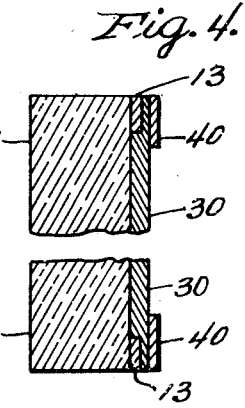
Fig. 3.
Fig. 4.
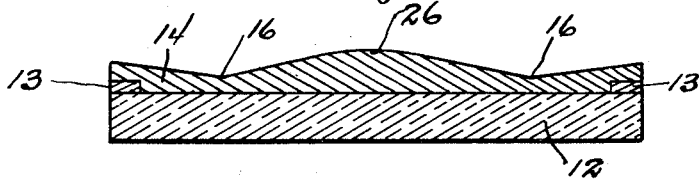
Fig. 5.
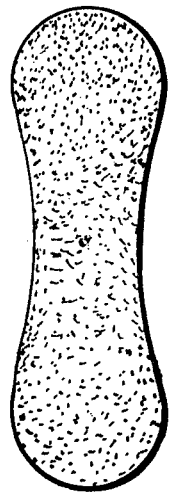
Fig. 7.
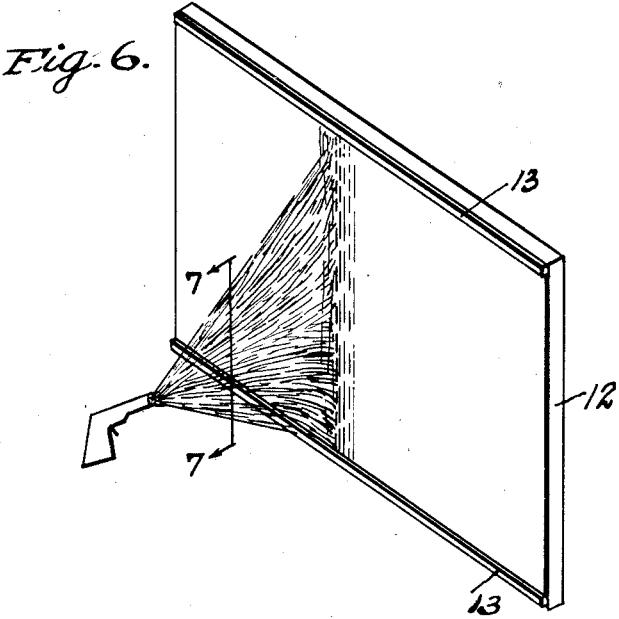
Fig. 6.
Inventor
LEIGHTON E. ORR
By Olen E. Bee
Attorney Patented Oct. 2, 1951

2,569,773

UNITED STATES PATENT OFFICE 2,569,773

ELECTROCONDUCTIVE ARTICLE

Leighton E. Orr, Tarentum, Pa., assignor to Pittsburgh Plate Glass Company, Allegheny County, Pa., a corporation of Pennsylvania Application November 20, 1948, Serial No. 61,191

9 Claims. (Cl. 219—19)

This invention relates to improved ceramic or refractory bodies, particularly to transparent ceramic or refractory articles such as windshields or other similar structures, having electroconductive transparent coatings deposited thereon. The invention further relates to an improved method for depositing electroconductive transparent coatings upon ceramic or refractory viewing closures. More particularly, it relates to articles of this character having laterally spaced electroconductive strips or bus bars in electrical contact with the film and adapted to facilitate passage of electric current through the coating.

It is known that transparent electroconductive films may be deposited upon glass by applying stannic chloride to the surface of glass heated above 400° F., preferably 850 to 1350° F. Films of superior conductivity may be produced according to methods described in applications for United States Letters Patent, Serial No. 762,658 and Serial No. 762,659, both filed July 22, 1947, by William O. Lytle. These films or coatings are obtained by spraying plate, window or other glass while it is heated to a temperature of above 400 F. but below the temperature at which the glass becomes molten, with tin tetrachloride or other tin salts in aqueous solution or in vapor state, in the presence of a reducing agent such as methanol, phenyl hydrazine hydrochloride, or other agents. The films thus obtained are of unknown composition, but appear to contain a preponderant amount of the order of 97 to 99% of a tin oxide and certain impurities which may include metallic tin, carbon, silicon, sodium and chlorine and other impurities, depending upon the composition of the applied tin containing solution. These films have a thickness of about 50 to 800 millimicrons, are transparent and have the unusual characteristic of being electroconductive, the particular degree of electroconductivity being dependent, to a large degree, upon the nature of the process of depositing the films. Tin oxide films, which are deposited in accordance with the processes described and claimed in the aforesaid applications of William O. Lytle, incorporation of the disclosure of which is made a part hereof by reference, have a resistance below about 500 ohms per unit square, a specific resistance below about 0.01 ohm centimeter, and a haze factor below about 2.5%. Further details respecting the production of these films will be supplied hereinafter. Although articles having such films are useful in many fields, they have been found to be especially useful as windshields, or viewing closures in automobiles, aircraft, trains and similar motive vehicles. In such use the coating is placed in series with a source of electric potential and is used as a heating element in order to heat the closure and prevent deposition of ice, fog, etc. thereupon.

As disclosed in the Lytle applications, a glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment and, therefore, preferably should be of a ceramic character. Furthermore, they should be capable of glazing or otherwise forming an adherent, well-bonded coating to the glass. The strips should adhere firmly to the glass sheet, and should have a conductivity at least 10 to 20 times that of the conductive coating. Generally, the strips are from about 0.1 to 1 inch in width.

In practice, it has been found that the most satisfactory compositions, for use in preparing the bus bars, comprise a highly conductive metal powder (preferably gold or silver) and a vitrifying binder. Typical ceramic conductive coating materials which may be used have the following composition:

1

| | Per cent by weight |
|---|---|
| PbO | 7.5 |
| $B_2O_3$ | 1.0 |
| $SiO_2$ | 1.5 |
| Flake silver | 70.0 |
| French fat Oil | 12.5 |
| Turpentine | 7.5 |

2

| | Per cent by weight |
|---|---|
| Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop, in use, excessive stresses in the glass, the bus bars preferably should be located on the extreme edge of the glass and the bus bar thickness should not exceed about 0.005 inch and, preferably, should be below about 0.003 inch.

After application of the metal bus bars to the glass sheet by painting or other method, the sheet is heated to the temperature at which application of the conductive coating may be effected, for example, above about 400 to 800° F. but below the fusion point of the glass, usually 950 to 1150° F. During this heating operation, the ceramic metal coating becomes glazed and is baked onto the glass so that a firm bond is established between the glass and the metal coating.

When the glass has been heated as above described, for one, two or more minutes, it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period, usually of the order of 2 to 20 seconds, depending upon the thickness of film to be produced, the air pressure imposed upon the atomizing spray gun, etc. Usually this spraying operation is conducted in air of atmospheric humidity or oxygen. However, conductive coatings have been obtained even when oxygen appears to be absent, although it is probable that oxygen, either from the atmosphere or combined in water or similar compound, is essential to the operation. This process results in the production of a base coated with a tin oxide electroconductive film.

Articles produced according to the above description, further details of which will be supplied below, are suitable for use as viewing closures or windows. Usually they are laminated with a suitable plastic such as polyvinyl butyral to reinforce the glass and provide a so-called "safety glass" construction. These closures may be successfully heated by imposing an electric potential across the bus bars, thus using the conductive film as a resistance element.

Products so produced have been satisfactory where the energy requirements for heating the glass sheet have not been large. In many cases, however, these products must be capable of supplying quite large amounts of heat, for example above 1500 to 2000 B. t. u. per hour per square foot. Such requirements mean that electric currents of substantial amperage pass through the film.

It has been found that an unduly large number of windshields or like panels of the type herein contemplated have failed in use or in test. This failure is manifested by fracture of the glass during passage of current through the electroconductive film.

According to the present invention it has been found that articles which are less likely to fail may be provided by recourse to electroconductive films having nonuniform surface resistivity, the distribution of this surface resistivity being such that areas in the film which tend to develop the highest temperature and/or to generate the most heat are predominately located at points spaced from the bus bars a substantial distance, for example 5 to 10 percent or more of the distance between the bus bars (usually at least one or two inches when commercial windshields or like closures are contemplated). This may be accomplished by providing electroconductive films which have their maximum conductivity immediately adjacent to the bus bar and which have lower conductivity in a central area in the current path between the bus bars.

Ideally speaking, it is desirable that each area or areas of maximum heat generation or temperature development be spaced from the bus bars as herein contemplated. However this may not be entirely possible because of the configuration of the sheet or base. For example, many articles having electroconductive films are not rectangular. Consequently bus bars on the sides thereof may be of unequal length. Frequently, in such cases high current densities tend to be established at the ends of the bus bars particularly when the bus bars are tapered to a point at the ends thereof. Similarly the distance between the bus bars may vary so greatly as to establish high current densities at certain areas along a bus bar. At these areas heat generation tends to be high and may even exceed the heat generation of other areas on the sheet or base. This is undesirable and should be avoided. Even in cases where avoidance of some hot spots at or near the bus bar is impossible or exceedingly difficult, the amount of heat generation and/or temperature development may be reduced by providing a film area in the current path to such hot spots having higher surface resistivity than that of the film adjacent the bus bar.

The provision of films wherein the preponderant areas of maximum surface resistivity are spaced a substantial distance from the bus bars offers certain advantages in addition to minimizing breakage and breakdown of bus bars. When articles herein contemplated are used as viewing closures in aircraft or other vehicle, the central area of the film remains free of ice, snow or mist under atmospheric conditions so severe that it is not possible to prevent their accumulation over the entire panel surface.

Several methods of achieving the invention herein contemplated are available. For example a thicker and therefore more electroconductive film may be deposited adjacent the bus bars. Alternatively the film adjacent the bus bar may be of a thickness equal to or even less than that of other areas but may be of a composition having a lower specific resistivity than that of the film spaced from the bus bars. Thus an aqueous solution of stannic chloride and a water soluble alkali metal fluoride such as ammonium bifluoride, sodium fluoride, etc. will produce a film which has electroconductivity many times that produced when no fluoride is used. Accordingly, the film adjacent the bus bars may be produced by the application of a fluoride containing solution to the area immediately adjacent to the bus and a solution which contains no fluoride in a central area.

According to a further embodiment, the film may be stippled in a central area with nonconducting areas to produce a higher conducting film adjacent the bus bar than in the area intermediate the bus bars.

According to a further embodiment of the invention, a convenient method of providing electroconductive films having desired properties has been provided. In accordance with this method, the solution is sprayed while the spray gun is adjusted to produce a spray having the shape of a dumbbell or "split" spray, i. e. a spray which is more concentrated on the ends thereof than in the center thereof. By locating the glass to be sprayed so that the dense spray at the ends of the spray pattern strikes the glass at or near the edges or sides thereof, a thicker film is deposited adjacent such edges than in the center thus producing a film having the desired properties.

Accomplishment of the foregoing constitute some of the principal objects of the invention, others of which will become apparent by reference to the ensuing description, taken in conjunction with the accompanying drawing, in which:

Fig. 2 is a diagrammatic fragmentary sectional view taken along lines 2—2 of Fig. 1;

Figs. 3, 4 and 5 are diagrammatic sectional fragmentary views corresponding to Fig. 2, and illustrating alternative embodiments of the invention which may be utilized in lieu of the embodiment in Fig. 2;

Fig. 6 is a diagrammatic perspective view of a typical method of preparing a glass panel according to an embodiment of this invention and Fig. 7 is a sectional view of Fig. 6 taken along line 7—7 of Fig. 6 which run in a direction perpendicular to the path of the spray.

Figure 1:
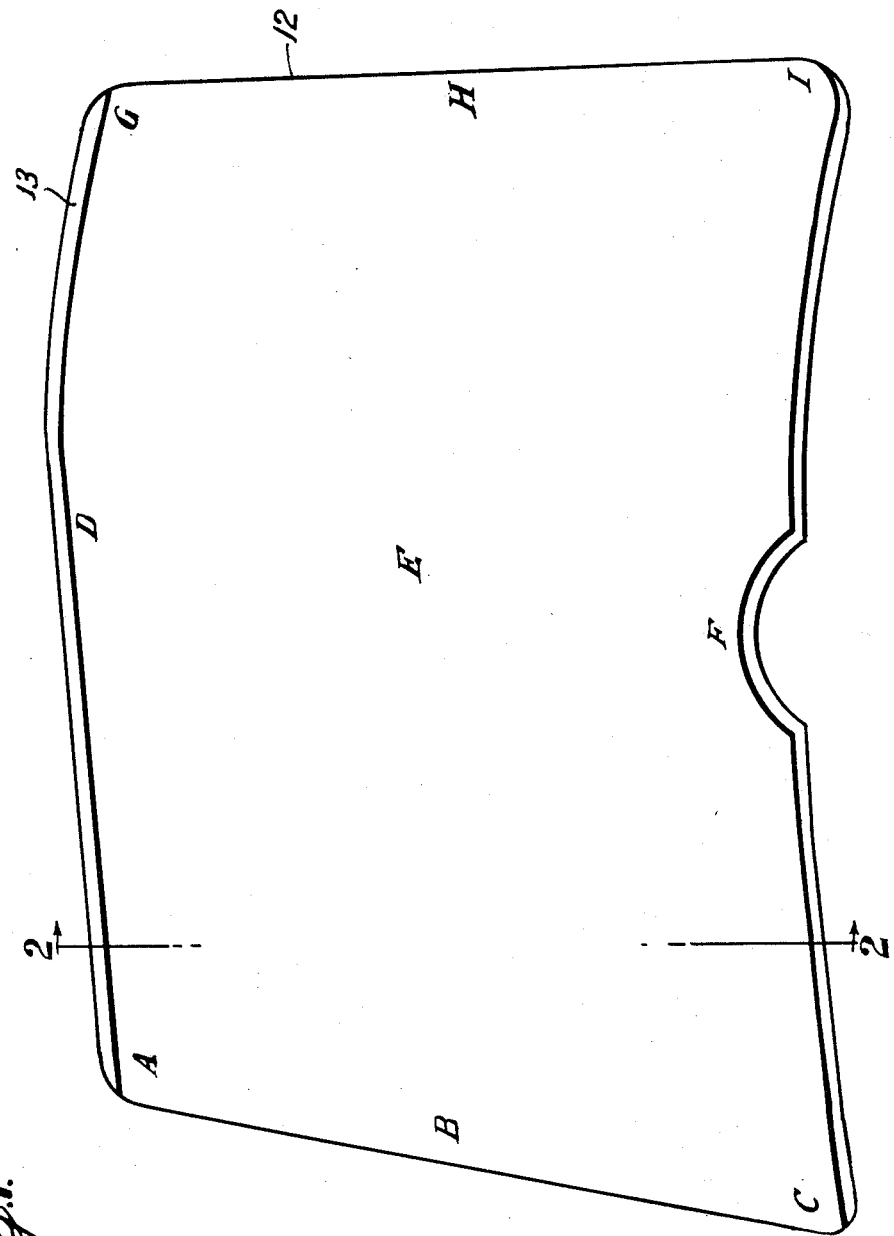
Fig. 1 is a plan view drawn to scale of a glass panel embodying the present invention suitable for use as a viewing closure in military aircraft.

The panel illustrated in Fig. 1 comprises a glass sheet 12 of substantially rectangular shape and rounded corners having bus bars, or conductive edge strips 13 of an electroconductive metal such as silver, gold, etc. along opposite sides and close to the edges (preferably within 0.2 inch of the edge and approximately one-eighth to one inch in width) of the glass sheet. These bus bars are disposed along the margins adjacent to the longest pair of opposite edges of the panel, whereby the distance between the bus bars is held to a minimum. Alternatively, they may be disposed on the edges of the panel. The entire surface area between the bus bars is provided with an electroconductive transparent film 14 of tin oxide or other material, such as is described hereinbefore.

As illustrated in the drawing the width of the glass sheet 12 is not constant but varies from a minimum at the center to a maximum near the ends thereof. Furthermore, the corners of the sheet are curved or rounded. Such rounded corners are desirable for certain structural reasons. However, bus bars disposed upon such sheets frequently burn at the ends thereof, particularly when the sheet is coated over its entire area with the electroconductive coating.

According to a further embodiment of this invention it has been found that this difficulty may be avoided to an appreciable degree by use of bus bars which are tapered to a point at the rounded ends. This taper generally begins after the change of curvature of the sheet begins and extends for a distance of about one eighth to one or two inches terminating before the end of the curve. Frequently the tapered portion extends around the corner of the sheet although this is not absolutely essential. Bus bars so constructed exhibit less tendency to burn during use of the conductive panel.

As shown with the film greatly enlarged in Fig. 2, the electroconductive film 14 is thickest at the edges adjacent the bus bars and is thinnest in the central area. Because of this variation in thickness, the conductivity of the areas adjacent the bus bars is greater than that of central areas.

This coating may be deposited according to the method illustrated in Figs. 6 and 7. According to this method a glass sheet is provided with suitable bus bars 13 by applying a thin coating of a conducting metallizing ceramic composition such as described above.

After application of the metal bus bars to the glass sheet by painting or other method, the sheet is heated to the temperature at which application of the conductive coating may be effected, for example above about 600 to 800° F. but below the fusion point of the glass, usually 950 to 1250° F. During this heating operation, the ceramic metal coating becomes glazed and is baked onto the glass so that a firm bond is established between the glass and the metal coating.

When the glass has been heated, for one, two or more minutes, it is withdrawn from the heating chamber and immediately is sprayed with the coating solution before substantial cooling of the glass sheet can take place. In this operation, a quantity of the coating solution is placed in an atomizing spray gun and the heated glass sheet is sprayed with an atomized spray of this material for a brief period.

In order to obtain the film having the desired thickness variation the spray gun is mounted and adjusted to produce a horizontally directed "split" or "dumbbell" type spray which has the spray pattern illustrated by the dots of the sectional view in Fig. 7 being wider and more dense adjacent the upper and lower ends of the spray section than in the center area thereof. This spray pattern may be obtained in a conventional manner with conventional spray guns simply by using the atomizing air pressures above that required to produce a uniform spray or by adjusting the spray gun to widen the spray at pressures where a uniform spray is obtained.

When the spray gun has been adjusted to produce the spray pattern illustrated in Fig. 7, the glass is supported vertically and is moved transversely through the spray with the upper and lower edges of the sheet passing horizontally through the upper and lower dense areas of the spray respectively. The sheet is passed through the spray at a rate such that a sheet approximately 26 inches long in its longest dimension and having the contour illustrated in Fig. 1 is sprayed within a matter of two to twenty seconds. Thereafter, the sheet is cooled. If necessary, in order to thicken the coating, the glass may be reheated and resprayed.

Various solutions may be used for this purpose. Typical suitable solutions or mixtures are the following:

1

$SnCl_4 \cdot 5H_2O$ _____per cent by weight__ 90
Aqueous formaldehyde (containing 40 percent by weight of formaldehyde)
         per cent by weight___ 10

2

$SnCl_4 \cdot 5H_2O$ _____grams__ 900
Phenyl hydrazine hydrochloride_____do____ 21
Methanol _____milliliters__ 90

3

Anhydrous stannic chloride_____grams__ 20,430
Methanol_____milliliters__ 1,854
Phenyl hydrazine_____grams__ 21
Water_____milliliters__ 7,056
Dioctyl sodium sulfosuccinate solution
         grams__ 918
 Such solution composed of:
Dioctyl sodium sulfosuccinate _____grams__ 10
Methanol _____ milliliters__ 45
Water _____do____ 45

4

Solution No. 3 (without dioctyl sodium sulfo-
  succinate) _____milliliters__ 70
Aqueous formaldehyde containing 40% by
  weight of formaldehyde_____grams__ 45
Ammonium bifluoride_____do____ 3

5

Solution No. 3_____grams__ 100
Antimony trichloride _____do____ [1] 1 or 2

[1] Grams per gram of stannic chloride in Solution No. 3.

6

Stannous fluoride_____grams__ 5
Methanol_____do____ 4
Water_____do____ 25

7

Methanol_____milliliters__ 1,000
Anhydrous stannic chloride_____do____ 170
Ammonium bifluoride _____grams__ 6

Furthermore anhydrous stannic chloride in liquid or vapor form may be sprayed in this manner. In addition, other tin salts such as stannous chloride, stannic iodide, stannic fluoride as well as salts of other metals which are capable of producing transparent electroconductive coatings (cadmium chloride or bromide, zinc acetate or bromide, indium triiodide, titanium tetrachloride, etc.) may be used.

The article thus obtained comprises a glass base or sheet with an electroconductive film of the type described thereupon. The thickness of this film is diagrammatically illustrated in Fig. 2 and thus appreciable variation in conductivity of the film may be detected.

Using a typical sheet produced according to the above process, the resistance of unit inch squares at various areas designated as A, B, C, D, E, F, G, H and I (Fig. 1) was measured. Areas A, D, G, C, F and I were located within about one or two inches of the side edges, areas A, G, C and I being only about two inches from the ends of the sheet and areas D and F being about in the middle of the sheet. Areas B, F and H were located approximately midway between areas A and C, D and F and G and I respectively. The surface resistivities in terms of ohms per unit square (the surface resistance of an area one inch square) were as follows:

| | Ohms per unit square |
|---|---|
| Area A | 92 |
| Area B | 136 |
| Area C | 97 |
| Area D | 92 |
| Area E | 102 |
| Area F | 77 |
| Area G | 138 |
| Area H | 175 |
| Area I | 140 |

It will be understood that the resistance set forth above is the average resistance of a one inch square. Thus even though the resistance may have been high or even infinite at a single point of minute area within the square the resistance of the square was as stated above. From the above table it will be apparent that the area of maximum resistance of the film is at the zone spaced from the bus bars and designated as H.

It will further be apparent that in general an area intermediate the shortest path between the bus bars at substantially any point along the bars is higher than the areas in the same path which are adjacent the bus bar. It is not necessary that the resistance in the central area be higher than the resistance along the entire length of the bus bars. It is only desired that in determining the resistance any shortest linear path from a point on one bus bar to the other bus bar (for example from A thru B to C or from D thru F to E) will pass through a central area spaced from at least one of the bus bars a distance of at least 5 percent of the length of the path which is higher as to surface resistivity than the area within 5 percent of the length of the path (for example one inch) of the bus bar. Usually, the average surface resistivity of the film within such distance from a bus bar is below the average resistance of the film.

It will be understood that wide variation in resistance over the film is permissible. Such variation is permissible so long as the current distribution during passage of current is such that the zones or areas of highest temperature (or current density) are spaced at least one or more inches from the bus bar and that the temperature of the film adjacent the bus bar is lower than that of the area of maximum temperature or heat generation in the film.

The variation in resistance between the central area and the areas adjacent the bus bars need not be large. Thus, as shown in the above table the resistance of area C is but 5 percent less than the resistance of central area E. The difference should at all events be at least sufficient to prevent the establishment of maximum heat generation or current density in the conducting area of the film adjacent the bus bar. This usually requires that the surface resistivity of areas adjacent the bus bars be at least 3 to 5 percent below the area of maximum resistance in the entire film (as measured in terms of unit inch squares) and preferably that the resistance of film areas at most of the points along the bus bar be at least 5 to 10 percent below that of the central area which is in the shortest path to the opposite bus bar. For example areas A, D and G should be at least 3 to 5 percent lower in resistance than the areas B, E and H respectively. In general the average surface resistivity of the area of a strip along the bus bar and 5 percent of the distance between the bus bars in width will be lower than that of the entire sheet or at least that of an equal sized strip between the bus bars and spaced therefrom. Preferably the change of surface resistivity is gradual and abrupt changes normally are avoided.

A convenient method of observing and determining the location of the zone of highest heat generation on the panel involves coating the electroconductive film with a thin coating (about 0.001 inch in thickness) of an easily fusible material such as beeswax, applying a suitable electric potential, for example 10–400 volts, between the bus bars and observing the point at which the wax first melts. This point may be considered to be the zone or area of maximum heat generation.

In certain cases it is not necessary that areas of low surface resistivity be adjacent both bus bars. For example when the configuration of an article is such that one bus bar of two parallel bus bars is substantially longer than the other the highest current density tends to be established adjacent the shorter bus bar. To prevent excessive heat generation the area adjacent the shorter bus bar should have lower average surface resistivity than the other area spaced therefrom. On the other hand, the areas along the longer bus bar do not tend to generate excessive heat and therefore no special precautions may be required along this bar.

Attention is called to the fact that the resistance of the areas G, H and I are appreciably higher than the resistances in the areas on the left side of the panel, A, B and C, or in the central areas D, E and F. This variation is established upon moving the plate or sheet through the spray, the leading edge usually having the highest resistance. When higher surface resistances are desired at one end than at the other end they may be obtained simply by passing the panel through the spray with the end desired to have the higher resistance being the leading edge.

It will be apparent to those skilled in the art that numerous embodiments are possible. While control of thickness is a good and convenient method of controlling surface resistance other means are available. Thus as shown in Fig. 3, a transparent glass or similar refractory plate 12 may be provided with bus bars 13 and two coatings 22 and 23 of different specific resistivities. For example, coating 22 which may be applied as a strip of one or several inches in width along the bus bars may have a low specific resistivity whereas coating 23 which may have a higher specific resistivity may be deposited in the central area and in electrical contact with the strips 22.

As an illustration coating 22 may be applied using solution No. 4 as the spraying solution and coating 23 applied using solution No. 1, 2 or 3. Alternatively stannic chloride pentahydrate may be melted and used to deposit coating 23 and coating 22 may be applied using solutions 1, 2, 3, 4 or 5.

In the embodiment illustrated in Fig. 4, a glass or similar base 12 may be provided with a transparent conductive coating 30 which extends across the entire sheet and into electrical contact with the bus bars 13. Strips 40 of electroconductive transparent tin oxide or its equivalent may be applied to the edge areas to increase the conductivity of the film adjacent the bus bars. These strips 40 may be of the same specific resistivity as coating 30 or may have a lower specific resistivity. If desired these strips 40 may be tapered inwardly in thickness in order to establish a gradual decrease in conductivity and to avoid sharp changes along the strip edge.

As shown in Fig. 5, it is not essential that the area of minimum conductivity be in the center of the panel. Thus the surface resistance of the film 14 may decrease to a minimum at 16 and thereafter increase to a value even higher than at the bus bars, for example at area 26.

The invention is particularly applicable to use in connection with a transparent tin oxide film. However the invention is also applicable in connection with other transparent electroconductive films, particularly metal oxide films. Thus the films herein contemplated may comprise cadmium oxide, zinc oxide, indium oxide, titanium oxide, thallium oxide, etc. which may be prepared using the bromide, chloride or acetate of the corresponding metal. Transparent metal films normally have poor light transmission but are suitable where this property is not seriously objectionable.

Where viewing closures for vehicles are to be provided, the base for the film normally is ordinary window or soda lime glass. Other refractory materials including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

What I claim is:

1. An article of manufacture which comprises a refractory base, a transparent electroconductive metal oxide film having nonuniform surface resistivity thereon and a pair of laterally spaced, longitudinally extending bus bars bonded to the base and in electrical contact with the film; the resistance distribution of said film being such that when electric current is passed therethru the area of maximum heat generation is spaced a substantial distance from a bus bar.

2. An article of manufacture which comprises a refractory base having thereon laterally spaced electroconductive bus bars extending along opposite sides of the base and a transparent electroconductive metal oxide film which is less electroconductive than the bus bars, said film being in electrical contact with the bus bars and having nonuniform surface resistivity, the area of highest surface resistivity of said film being at a point spaced a substantial distance from one of the bus bars.

3. An article of manufacture which comprises a transparent glass base, having thereon a pair of laterally spaced metal electroconductive bus bars and a transparent electroconductive metal oxide coating which is less electroconductive than the bus bars, said coating being in electrical contact with the bus bars, and the areas of said coating immediately adjacent at least one of the bus bars, being more highly electroconductive than an area of electroconductive coating spaced a substantial distance from the bus bar.

4. An article of manufacture as described in claim 1, in which the transparent electroconductive metal oxide film is tin oxide.

5. An article of manufacture which comprises a refractory base, a pair of metal bus bars bonded to the base and extending along opposite sides of the base, a transparent electroconductive film having non-uniform overall resistivity, and having electroconductivity substantially less than that of the bus bars, bonded to the base and in electrical contact with the bus bars; transparent areas of said film along the bus bars being thicker than areas of said film spaced from and between the bus bars whereby when electric current passes through the film a higher temperature is established in a central area spaced a substantial distance from the bus bars than is established in the relatively thicker areas adjacent the bus bars.

6. The article of claim 5 wherein areas of highest temperature are at least one inch from the bus bar.

7. The article of claim 6, wherein the metal oxide is tin oxide.

8. An article of manufacture in accordance with claim 1 in which the areas of maximum heat generation are spaced from both bus bars.

9. An article of manufacture in accordance with claim 3 in which more highly electroconductive areas are disposed immediately adjacent both bus bars.

LEIGHTON E. ORR.

REFERENCES CITED

The following references are of record in the file of this patent:

UNITED STATES PATENTS

| Number | Name | Date |
|---|---|---|
| 2,021,661 | Kisfaludy | Nov. 19, 1935 |
| 2,061,106 | Schellenger | Nov. 17, 1936 |
| 2,061,107 | Schellenger | Nov. 17, 1936 |
| 2,119,680 | Long | June 7, 1938 |
| 2,419,537 | Christensen | Apr. 29, 1947 |
| 2,429,420 | McMaster | Oct. 21, 1947 |
| 2,431,923 | Dimmick | Dec. 2, 1947 |
| 2,475,379 | Stong | July 5, 1949 |
| 2,507,036 | McCrumm et al. | May 9, 1950 |

FOREIGN PATENTS

| Number | Country | Date |
|---|---|---|
| 461,275 | Great Britain | Feb. 15, 1937 |